US005858075A

United States Patent [19]
Deardurff et al.

[11] Patent Number: 5,858,075
[45] Date of Patent: Jan. 12, 1999

[54] DYE SET FOR IMPROVED INK-JET IMAGE QUALITY

[75] Inventors: Larrie A. Deardurff; Hiang P. Lauw; Mary E. Austin, all of Corvallis, Oreg.

[73] Assignee: Hewlett-Packard Company, Palo Alto, Calif.

[21] Appl. No.: 810,568

[22] Filed: Mar. 3, 1997

[51] Int. Cl.⁶ .................................................. C09D 11/02
[52] U.S. Cl. .................................. 106/31.27; 106/31.58; 106/31.59
[58] Field of Search ............................ 106/31.27, 31.58, 106/31.59

[56] References Cited

U.S. PATENT DOCUMENTS

| | | | |
|---|---|---|---|
| 4,657,590 | 4/1987 | Gamblin | 106/22 |
| 4,783,220 | 11/1988 | Gamble et al. | 106/27 |
| 4,818,285 | 4/1989 | Causley et al. | 106/31.43 |
| 4,889,560 | 12/1989 | Jaeger et al. | 106/31.43 |
| 5,013,455 | 5/1991 | Leimer et al. | 210/729 |
| 5,100,469 | 3/1992 | Pontes et al. | 106/20 |
| 5,108,504 | 4/1992 | Johnson et al. | 106/25 |
| 5,116,409 | 5/1992 | Moffatt | 106/22 |
| 5,118,350 | 6/1992 | Prasad | 106/22 |
| 5,136,310 | 8/1992 | Drews | 346/140 R |
| 5,139,574 | 8/1992 | Winnik et al. | 106/22 |
| 5,141,599 | 8/1992 | Jahn et al. | 162/137 |
| 5,143,547 | 9/1992 | Kappele | 106/22 |
| 5,145,519 | 9/1992 | Kappele | 106/22 |
| 5,156,675 | 10/1992 | Breton et al. | 106/22 |
| 5,185,034 | 2/1993 | Webb et al. | 106/22 R |
| 5,198,023 | 3/1993 | Stoffel | 106/22 R |
| 5,211,747 | 5/1993 | Breton et al. | 106/20 R |
| 5,273,573 | 12/1993 | Kappele | 106/31.27 |
| 5,534,051 | 7/1996 | Lauw | 106/22 R |
| 5,536,306 | 7/1996 | Johnson et al. | 106/22 R |
| 5,700,314 | 12/1997 | Kurbayashi et al. | 106/31.27 |
| 5,725,641 | 3/1998 | MacLeod | 106/31.5 |

FOREIGN PATENT DOCUMENTS

PCTGB9600262 8/1996 WIPO .
PCTGB9600300 8/1996 WIPO .

OTHER PUBLICATIONS

German Patent Application Serial No. DE 196 18 607.2, filed on May 9, 1996, by Gerhard Dransmann et al., "Recording Material for Ink–Jet Printing" (Aufzeichnungsmaterial fur Tintenstrahl–Druckverfahren), assigned to Felix Schoeller Company.

*Primary Examiner*—Helene Klemanski

[57] ABSTRACT

In accordance with the invention a set of dyes suitable for use in ink-jet inks and method for formulating the same are provided. The yellow ink of the present invention contains a yellow colorant having a CIELAB hue angle, h°, less than 90° to provide a true representation of colors, particularly skin tone colors. More specifically, a specific dye set for formulating the yellow, cyan, and magenta inks is disclosed, comprising Yellow 104, Direct Blue 199, and Magenta 377 dyes, respectively. The Yellow 104, the Magenta 377, and the DB 199 dyes provide near photographic images having lightfast characteristics necessary to preserve the trueness of the inkjet images by (1) producing images having less light fade and (2) images that when they do fade, fade in a more uniform manner across the color set.

40 Claims, 1 Drawing Sheet

DYE SET FOR IMPROVED INK-JET IMAGE QUALITY

FIELD OF INVENTION

The present invention generally relates to ink-jet printing, and in particular to a specific dye set for improving ink-jet image quality.

BACKGROUND OF INVENTION

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality. In general, ink-jet print quality still falls short of that produced by more expensive technologies such as photography and offset or gravure printing. A surge in interest in ink-jet imaging (e.g., the rendition of pictures) has resulted in the need to produce near photographic quality printed images at a reasonable cost. The challenge remains to further improve the image quality and lightfastness of ink-jet printed images, especially images containing skin tones without increasing their cost.

Color ink-jet printers typically use three inks of differing hues: magenta, yellow, and cyan, and optionally black. The particular set of colorants, e.g., dyes, used to make the inks is called a "primary dye set." A spectrum of colors, e.g., secondary colors, can be generated using different combinations of the primary dye set. In printing processes such as lithography, dye transfer, and some types of thermal transfer, it is possible to vary spot size so that less is demanded of the primary colored inks when producing a good secondary. When the color inks are used in a binary printing device, that is, one in which a dot of color is either present or absent, e.g., a thermal ink-jet printer, the ability of the primaries to give recognizable secondaries is even more important.

If such an ink is to be used in an ink-jet printing device, characteristics such as crusting, long term stability, and materials compatibility must also be addressed. If the ink is to be used in a thermal ink-jet printer, the further constraint of being thermally stable (kogation-resistant) is added.

In general, a successful ink set for color ink-jet printing must be compatible with the ink-jet pen and printing system. Some of the required properties for the ink-jet ink include: good crusting resistance, good stability, the proper viscosity, the proper surface tension, little color-to-color bleed, rapid dry time, no negative reaction with the vehicle, high solubility of the dyes in the vehicle, consumer safety, low strike through, high color saturation, and good dot gain.

Furthermore, the color characteristics of the colorants play an important role in the quality of the printed ink-jet image. Color ink-jet inks have been designed and tailored for printing business graphics such as depiction of information in the form of "pie-charts" and "bar-charts." U.S. Pat. Nos. 5,108,504; 5,116,409; 5,118,350; 5,143,547; 5,145,519; 5,185,034; 5,198,023; 5,534,051; and 5,536,306 disclose yellow dyes, namely acid yellow 23, basic yellow 13, basic yellow 51, and direct yellow 86, for use in ink-jet inks. These dyes, although suitable for business graphics, do not provide a "true" representation of skin tones.

Any given perceived color can be described using any one of the color spaces, such as CIELAB, and Munsell, as is well known in the art. For example, in the Munsell color space a given color is defined using three terms, Hue, Value, and Chroma. Similarly, as illustrated in FIGS. 1 and 2, in the CIELAB color space, a color is defined using three terms L*, a*, and b*. L* defines the lightness of a color, and it ranges from zero (black) to 100 (white). The terms a* and b*, together, define the hue. The term a* ranges from a negative number (green) to a positive number (red). The term b* ranges from a negative number (blue) to a positive number (yellow). Additional terms such as h° (hue angle) and C* (chroma) are used to further describe a given color, wherein $$h° = \tan^{-1} b*/a* \qquad \text{equation 1}$$

$$C* = (a*^2 + b*^2)^{1/2} \qquad \text{equation 2}$$

One attribute which is particularly important in imaging (i.e., color rendition of pictures) is "color trueness." Color trueness describes how close the ink-jet printed image is to the original or primary object, such as the skin tone of a human being or the color of the sky. In addition, it is important that the printed image preserve its color characteristics over time as it is exposed to light. Thus, there is a need for more lightfast colorants. It is also of particular importance that when the image does fade, the fading occurs uniformly across all printed colors, thus minimizing the hue shift between the more faded and the less faded colors.

In the CIELAB color space, delta E ($\Delta E$) defines the difference between two sets of colors, such as the color of the printed image and the original object, or the color of the original printed image and the color of the same image after lightfade—the higher the $\Delta E$ number, the more difference between the two colors $$\Delta E = (\Delta L*^2 + \Delta a*^2 + \Delta b*^2)^{1/2} \qquad \text{equation 3}$$

Inks are known which possess one or more of the foregoing properties. However, few inks are known that possess all the foregoing properties, since an improvement in one property often results in the degradation of another property. Thus, many inks used commercially represent a compromise in an attempt to achieve an ink evidencing at least an adequate response in each of the foregoing considerations. Accordingly, investigations continue into developing ink formulations which have improved properties and which do not improve one property at the expense of the others. Thus, challenge remains to further improve the image quality and light fastness of the ink-jet prints without sacrificing pen performance and reliability.

DISCLOSURE OF THE INVENTION

In accordance with the invention inks suitable for use in ink-jet inks and method for formulating the same are provided. The yellow ink of the present invention contains a yellow colorant having a CIELAB hue angle, h°, less than 90° to provide a true representation of colors, particularly skin tone colors. More specifically, a specific dye set for formulating the yellow, cyan, and magenta inks is disclosed, comprising Yellow 104, Direct Blue 199, and Magenta 377 dyes, respectively. The Yellow 104, the Magenta 377, and the DB 199 dyes provide near photographic images by (1) providing good skin tone colors; and (2) having light fast characteristics necessary to preserve the trueness of the ink-jet images. The light fast characteristics provided by producing (a) images having less light fade, and (b) images that when they do fade, fade in a more uniform manner across the color set.

In the practice of the invention, the yellow, cyan, and magenta aqueous inks each comprise from about 0.1 to about 5 wt % of at least one dye; from about 5 to about 20 wt % of at least one organic solvent; 0 to about 5 wt % of an alcohol; 0 to about 1.5 wt % of at least one component independently selected from the group consisting of surfactants, buffers, biocides, and metal chelators; and the balance water.

The ink-jet inks formulated in accordance with the invention exhibits true representation of colors. Furthermore, the present ink compositions offer good lightfastness and adaptability to plain and coated media.

DETAILED DESCRIPTION OF THE INVENTION

Figure 1:
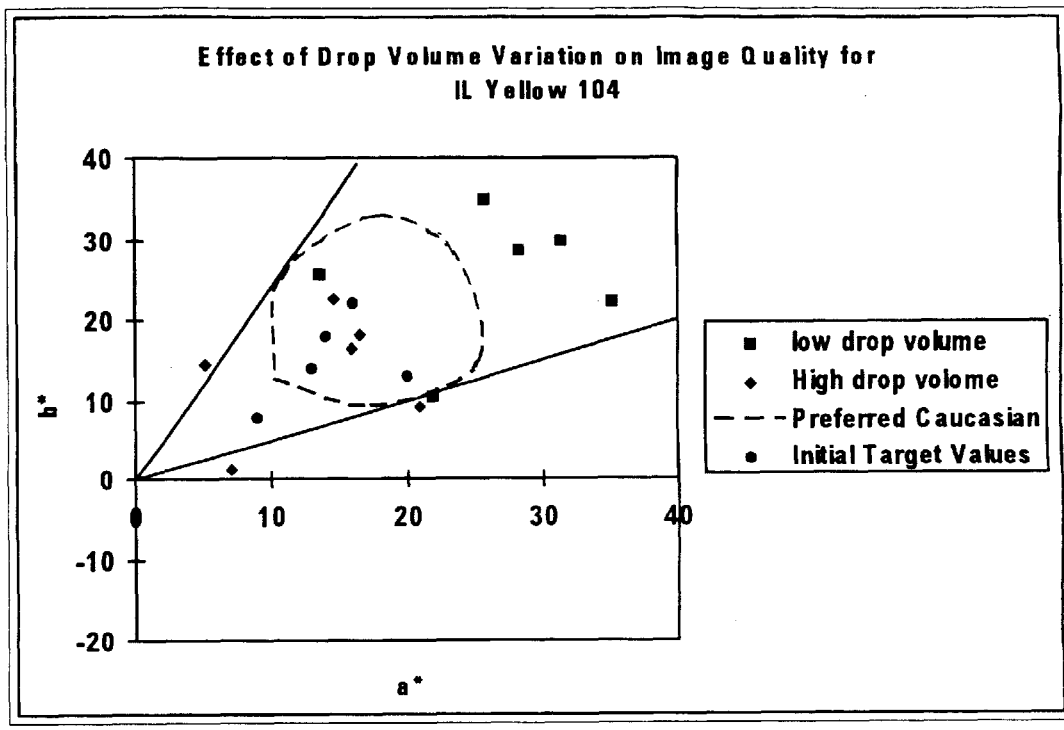
FIG. 1 is a plot of b* versus a* for Yellow 104 dye, depicting the enhancement in the color quality of the printed image, as a result of the invention.

The invention described herein is directed to dye sets for printing ink-jet images using commercially available ink-jet printers such as DESKJET® printers, manufactured by Hewlett-Packard Company, of Palo Alto, Calif. More specifically, a specific dye set for formulating the yellow, cyan, and magenta inks is disclosed. The dye set enables the production of high-quality printed images having true representation of colors even after lightfade. The present dye set can produce true colors on a variety of media, including uncoated paper, clay coated paper, and gelatin coated media, even upon exposure to light.

Gelatin coated ink-jet media, typically comprise a polyethylene-coated substrate or paper support with a gelatin coating thereon. Gelatin coated ink-jet media have been described in patents such as U.S. Pat. No. 5,141,599 by Reiner et al., issued Aug. 25, 1992 and assigned to Felix Schoeller Company. German patent application DE 196 18 607.2 entitled "Recording Material for Ink-Jet Printing" ("Aufzeichnungsmaterial fuur Tintenstrahl-Druckverfahren") by Gerhard Dransmann et al., filed on May 9, 1996, assigned to Felix Schoeller Company, and incorporated herein by reference, describes a recording material for ink-jet printing comprising a paper support, a receiving layer, and a top layer coated on the receiving layer. The receiving layer comprises gelatin. The top coating comprises either or both fine porous pigments and filler particles, and a binder such as polyvinyl alcohol or modified polyvinyl alcohol.

The ink set of the invention includes yellow, cyan, and magenta inks containing a yellow dye having a hue angle less than 90°, a cyan dye, and a magenta dye, respectively. The specific ink set disclosed comprises formulating the yellow, cyan, and magenta inks with Yellow 104, Direct Blue 199, and Magenta 377 dyes, respectively. The present yellow, cyan, and magenta aqueous ink compositions each comprise in general from about 0.1 to about 5 wt % of at least one dye and a vehicle comprising the following components (in wt % of total ink composition): from about 5 to about 20 wt % of at least one organic solvent; 0 to about 5 wt % of an alcohol; 0 to about 1.5 wt % of at least one component independently selected from the group consisting of surfactants, buffers, biocides, and metal chelators; and the balance water.

In the practice of the invention, each ink color, namely cyan, yellow, and magenta, can comprise more than one dye load. That is, there can be one or more ink-jet pens filled for each ink color, each pen having a different dye load or a different dye. For example, there can be two cyan pens, each one containing a different dye load and a different cyan dye.

All concentrations herein are in weight percent of total ink composition, unless otherwise indicated. The purity of all components is that employed in normal commercial practice for ink-jet inks.

COLORANTS
YELLOW DYE

In the practice of the invention, the yellow ink comprises one or more yellow colorants having a CIELAB hue angle of less than about 90° preferably, from about 78° to less than 90°, and more preferably, from about 80° to about 88°. Examples of more preferred yellow dyes with CIELAB hue angle less than 90° are provided in Table 1, below. Most preferably, Yellow 104 (Y104), an azo dye, available from Ilford AG, Rue de l'Industrie, CH-1700 Fribourg, Switzerland, is used in the practice of the invention.

TABLE 1

| YELLOW DYE | SOURCE | CIELAB HUE ANGLE (h°) |
|---|---|---|
| Yellow 104 (Y104) | Ilford | 83 |
| Direct Yellow 4 (DY4) | BASF | 88 |
| PJY H-3RNA | Zeneca Colors | 74.8 |
| Direct Yellow 50 (DY50) | Zeneca Colors | 87.3 |

Ilford - Ilford AG, Rue de l'Industrie, CH-1700 Fribourg, Switzerland.
BASF - BASF Aktiengesellschaft, Ludwigshafen, Germany.
Zeneca Colors - Zeneca Colors, New Castle, Delaware, USA.

The yellow dye is present in an amount from about 1 to about 5 wt. %, preferably, from about 2.5 to about 3.5 wt. %, and most preferably, from about 2.5 to about 3 wt. %. In setting the concentration of the yellow dye, it is desired that the ink has an absorbance of 0.07 at the lambda maximum of 402 for a 1:10,000 dilution.

CYAN DYE

The cyan ink of the present invention comprise one or more phthalocyanine dyes, and more preferably, Direct Blue 199 dye (DB199), available form Zeneca Colors as Projet Cyan 1. More specifically, the DB 199 dye is treated to replace undesirable cations, such as sodium and ammonium, with tetramethylammonium (TMA). Methods for the replacement of undesirable cations with TMA are known and described in the art as in U.S. Pat. No. 5,534,051 assigned to the present assignee. The TMA salt of DB199 enables the ink-jet printer to produce high-quality color images in a reliable manner less encumbered by the potential for crusting and precipitation of non-TMA salts of DB199.

The cyan dye is present in an amount from about 0.1 to about 5 wt. %, preferably from about 2.5 to about 3.5 wt. %, and most preferably from about 2.5 to about 3 wt. %. In setting the concentration of the cyan dye, it is desired that the ink have an absorbance of 0.09 at the lambda maximum of 618 nm for a 1,10:000 dilution.

MAGENTA DYE

The magenta ink of the present invention comprises one or more magenta dyes. More preferably, the magenta ink comprises a magenta dye selected from the group consisting of Magenta 377, Reactive Red 29, Reactive Red 180, and mixtures thereof. Most preferably, Magenta 377 (M377), an azo dye, available from Ilford AG, Rue de l'Industrie, CH-1700 Fribourg, Switzerland, is used in the practice of the invention.

The magenta dye is present in an amount from about 0.1 to about 5 wt. %, preferably from about 2.5 to about 3.5 wt. %, and most preferably from about 2.5 to about 3 wt. %. In setting the concentration of the magenta dye, it is desired that the ink have an absorbance of 0.07 at the lambda maximum of 518 nm for a 1:10,000 dilution.

BLACK DYE

The black ink suitably employed in the practice of the invention can be dye based or pigment-based colorant, preferably, dye-based. The black ink can also be a composite of the three primary colors, yellow, cyan, and magenta. Suitable black dye-based inks are disclosed and claimed, for example, in U.S. Pat. No. 4,963,189, entitled "Waterfast Ink Formulations with a Novel Series of Anionic Dyes Containing Two or More Carboxyl Groups" and assigned to the present assignee. Suitable black pigment-based inks are disclosed and claimed, for example, in U.S. Pat. No. 5,085,698, entitled "Aqueous Pigmented Inks for Ink Jet Printers"; U.S. Pat. No. 5,221,334, entitled "Aqueous Pigmented Inks for Ink Jet Printers"; and U.S. Pat. No. 5,302,197, entitled "Ink Jet Inks"; all assigned to E. I. Du Pont de Nemours and Company. The preferred black dye is Processed Reactive Black 31, available from Zeneca Colors.

VEHICLE

The inks of the present invention comprise an aqueous vehicle comprising the following components (in wt % of total ink composition): from about 5 to about 20 wt % of at least one water soluble organic solvent; 0 to about 5 wt % of an alcohol; 0 to about 1.5 wt % of at least one component independently selected from the group consisting of surfactants, buffers, biocides, and metal chelators; and the balance water.

ORGANIC SOLVENT

The inks of the present invention comprise from about 5 to about 20 wt % organic solvent. More preferably, the inks comprise from about 8 to about 15 wt % organic solvent, with a concentration from about 9 to about 11 wt % being the most preferred.

The water soluble organic solvents suitably employed in the present ink-jet ink compositions include any of, or a mixture of two or more, of such compounds as nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols, (e.g., 1,2-ethandiol), propanediols (e.g., 1,2-propanediol, 1,3-propanediol, 2-ethyl-2-hydroxy-methyl-1,3-propanediol, ethylhydroxy-propanediol (EHPD), butanediols (e.g., 1,2-butanediol, 1,3-butanediol, 1,4-butanediol), pentanediols (e.g., 1,2-pentanediol, 1,5-pentanediol), hexanediols (e.g., 1,6-hexanediol, 2,5-hexanediol, 1,2-hexanediol), heptanediols (e.g., 1,2-heptanediol, 1,7-heptanediol), octanediols (e.g., 1,2-octanediol, 1,8-octanediol); glycol ethers and thioglycol ethers, commonly employed in ink-jet inks, such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol.

Preferably, the organic solvent comprises 1,2 diols of $C_5$–$C_7$, namely, 1,2-pentanediol, 1,2-hexanediol, and 1,2-heptanediol; and most preferably, 1,2-hexanediol is employed in the practice of the invention.

ALCOHOL

The inks of the present invention optionally comprise 0 to about 5 wt % alcohol. More preferably, the inks comprise from about 1 to about 5 wt % alcohol, with a concentration from about 1.5 to about 2.5 wt % being the most preferred.

Alcohols suitably employed in the present ink-jet ink compositions include any of, or a mixture of two or more of such compounds as the diols listed above and $C_3$–$C_6$ alcohols (e.g., propanol, butanol, pentanol, and hexanol and all isomers thereof such as 1-propanol and 2-propanol). Preferably, n-butanol, iso-butanol, n-propanol, n-pentanol, 1,2-butanediol; and most preferably, n-butanol, are employed in the practice of the invention.

SURFACTANT

The inks of the present invention optionally comprise 0 to about 1.5 wt % surfactant. More preferably, the inks comprise from about 0.5 to about 1.3 wt % surfactant, with a concentration from about 0.8 to about 1.2 wt % being the most preferred.

In the practice of the invention, one or more surfactants may optionally be used. Non-ionic surfactants, such as secondary alcohol ethoxylates (e.g., Tergitol series available from Union Carbide Co.), non-ionic fluoro surfactants (such as FC170C available from 3M), non-ionic fatty acid ethoxylate surfactants (e.g., Alkamul PSMO-20 available from Rhone-Poulenc), and fatty amide ethoxylate surfactants (e.g., Aldamide L203 available from Rhone-Poulenc) are preferred, with secondary alcohol ethoxylates being the most preferred. In the practice of the invention, the secondary alcohol ethoxylates serve to prevent color to color bleed by increasing the penetration of the inks into the print medium. Secondary alcohol ethoxylates are nonionic surfactants and are commercially available, for example, from Union Carbide Co. (Houston, Tex.) as the Tergitol series, such as Tergitol 15-S-5 and Tergitol 15-S-7. Tergitol 15-S-5 is the preferred surfactant.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have from about 12 to about 18 carbon atoms in the aliphatic chain, while the number of ethoxylated units is predominantly in the range of from about 4 to about 8 units. Thus, "Tergitol 15-S-5" represents a secondary alcohol ethoxylate surfactant predominantly having about 15 carbons in its aliphatic chain and about 5 ethoxylated units. Tergitol 15-S-5 and Tergitol 15-S-7 are the preferred surfactants, with Tergitol 15-S-5 being the most preferred.

BUFFER

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Buffers employed in the practice of the invention to modulate pH can be organic-based buffers employed should provide a pH ranging from about 3 to about 9 in the practice of the invention, preferably about 6.5 to about 8 and most preferably from about 6.7 to 7.1. Examples of preferably-employed buffers include Trizma Base, available from companies such as Aldrich Chemical (Milwaukee, Wis.), 4-morpholinepropanesulfonic acid (MES), and 4-morpholinepropanesulfonic acid (MOPS). Most preferably, MES is employed in the practice of the invention.

METAL CHELATOR

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Metal chelators employed in the practice of the invention are used to bind transition metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind transition metal actions. More preferably, EDTA, and DTPA; and most preferably EDTA in its disodium salt form is employed in the practice of the invention.

BIOCIDE

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

INDUSTRIAL APPLICABILITY

The specific ink set disclosed herein is expected to find commercial use in ink-jet color printing:

EXAMPLES

Inks were formulated and different qualities of the formulated inks were measured in an effort to assess the benefits attained in the practice of the invention, namely, effect of yellow dye on skin tone; lightfade for the primary and secondary colors, the skin tone colors, and the gray tone colors; and dot gain and dot shape.

PRINT SAMPLE GENERATION METHOD

Print samples of formulated inks, where necessary, were generated using a Hewlett-Packard DeskJet® printer. The print media used included uncoated paper such as Gilbert Bond paper manufactured by Mead; coated media such as the clay coated Hewlett-Packard Premium InkJet Paper, part number 51634Y; and gelatin coated ink-jet media.

Example 1
EFFECT OF YELLOW DYE ON IMAGE QUALITY

The effect of hue angle of the yellow dye on generating skin tone colors was evaluated by formulating a yellow ink containing Yellow 104 (Y104) dye. For comparison, an ink containing Direct Yellow 132 (available as Projet Yellow 1G from Zeneca Colors), a yellow dye with a hue angle of 94°, and commercially used in ink-jet printers was also formulated. Cyan and magenta inks were formulated using DB199 and M377, respectively. The concentrations of the yellow, cyan, and magenta dyes at a 1: 10,000 dilution were

| yellow dye | absorbance of 0.07 at the lambda$_{max}$ of 402 nm |
| --- | --- |
| cyan dye | absorbance of 0.09 at the lambda$_{max}$ of 618 nm |
| magenta dye | absorbance of 0.07 at the lambda$_{max}$ of 518 nm |

The aqueous vehicle comprised

| organic solvent | 10% | 1,2-hexanediol |
| --- | --- | --- |
| alcohol | 2% | n-butanol |
| surfactant | 1% | Tergitol 15-S-5 |
| buffer | 0.2% | MES |

-continued

| metal chelator | 0.2% | EDTA |
| --- | --- | --- |
| biocide | 0.2% | Proxel GXL |
| balance | water | |

Hue angle (h°) for each of the yellow dyes was first determined by dissolving about 1 to about 5 wt % of the dye in the desired ink vehicle. The desired absorbance at the lambda maximum was about 0.07 for a 1:10,000 dilution. The ink-jet pens were filled with the inks and a color block for each ink was printed at full density on gelatin coated media. The L*,a*, and b* values were measured using a commercially available colorimeter such as Hunter Ultrascan available from Hunter Associates Laboratories, Reston, Va., USA. The hue angle was then measured according to Equation 1, above. The hue angles for Y104 and DY132, were 83 and 94, respectively.

The effect of the yellow dye on image quality was measured by generating color palettes containing skin tones. In an ink-jet printer, there is variability in the drop volume ejected by the ink-jet print cartridge. This variability can lead to a difference in the amount of ink that is put down on paper when an image is printed. A robust printing system should be fairly independent of these changes. Since skin tone colors are considered "memory colors," even small deviations are distinguishable.

To study the effect of the yellow dye on the robustness of the printing system, two groups of pens were filled with ink. The yellow colorant in one group was Y 104, and DY132 in the other. Each pen group consisted of two sets of pens. Each pen set consisted of a yellow ink-filled pen, a magenta ink-filled pen, a cyan ink-filled pen, and a black ink-filled pen. The cyan and black ink-filled pens in both sets had nominal drop volumes of about 28 picoliters (pl). The yellow and magenta ink-filled pens in one set had a larger drop volume as compared to the nominal drop volume pens. The yellow and magenta ink-filled pens in the other set had a smaller drop volume as compared to the nominal drop volume pens. The drop volume differences between the larger and smaller drop volume pens corresponded to 6 standard deviations of pens having an average drop volume.

A 72 color palette, 6 of which represented skin tones, was printed for each of the two sets in each of the two groups. A total of 4 palettes were printed. To generate the skin tone color blocks, the color coordinates of skin tones of a "reference" image such as the "Kids on the Couch" picture supplied on a CD-ROM by Graphic Arts Technical Foundation (GATF), Pittsburgh, Pa. USA, Verison 2.1 Color Control Images, were first measured using a Macbeth Color Checker of Macbeth Company. A computer program such as Photoshop made by Adobe Systems Incorporated, Moutain View, Calif. USA, was then used to create the image file having the measured coordinates and thereafter printed on the printing medium.

In addition, a gray scale or gradient was also generated by printing a series of 10 composite black squares (a tertiary color generated by printing cyan, magenta, and yellow colors using a Dot on Dot print mode), each square having different print densities (10 representing the highest print density).

Figure 2:
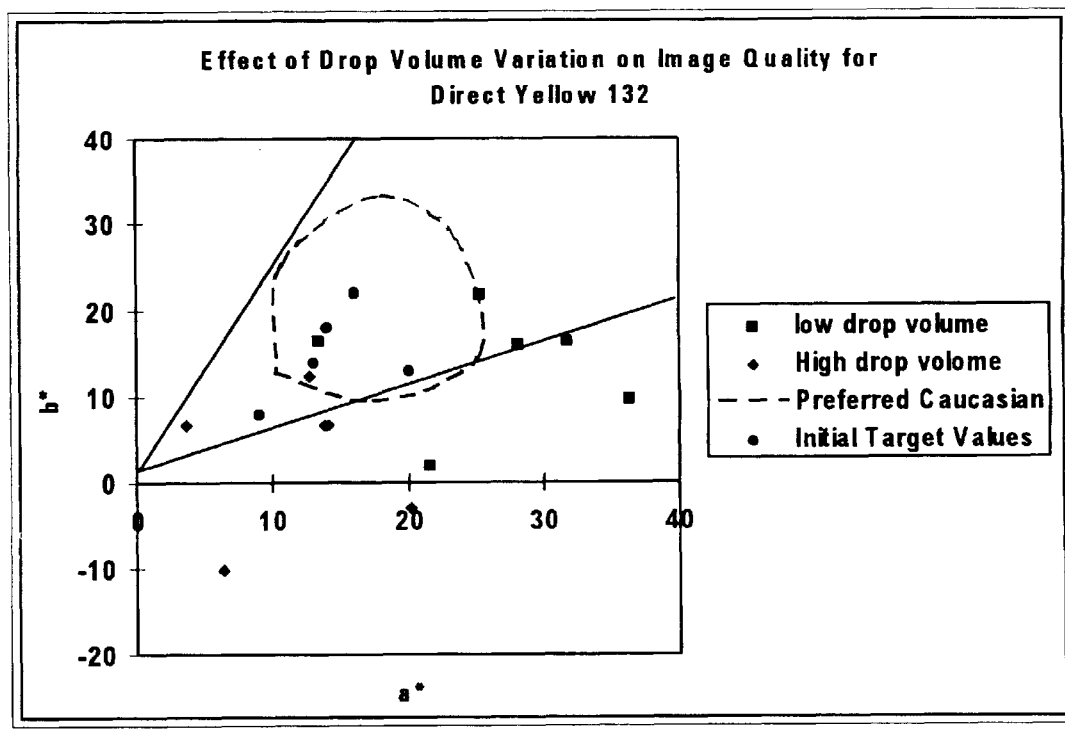
FIG. 2 is a plot of b* versus a* for Direct Yellow 132 dye, depicting the color quality of the printed image compared to preferred skin tone colors.

The a* and b* color coordinates of the printed samples were measured using a commercial calorimeter such as Hunter Ultrascan, made by Hunter Associates Laboratories, Reston, Va., USA, using standard color measurement procedures. The a* and b* measurements for the two groups at the two drop volumes, low and high, are represented in FIGS. 1 and 2, respectively. The color difference, ΔE, between the high and low drop volume prints was calculated for each group, and reported in Table 2 below.

TABLE 2

|  | ΔE | |
|---|---|---|
|  | DY132 GROUP | Y104 GROUP |
| Gray 1 | 6 | 7 |
| Gray 2 | 10 | 10 |
| Gray 3 | 14 | 14 |
| Gray 4 | 18 | 17 |
| Gray 5 | 20 | 20 |
| Gray 6 | 23 | 22 |
| Gray 7 | 23 | 22 |
| Gray 8 | 18 | 16 |
| Gray 9 | 9 | 6 |
| Gray 10 | 1 | 1 |
| Skin 1 | 15 | 15 |
| Skin 2 | 17 | 18 |
| Skin 3 | 19 | 19 |
| Skin 4 | 22 | 21 |
| Skin 5 | 22 | 21 |
| Skin 6 | 21 | 19 |

As can be noted, the ΔE numbers were very similar for each of the two groups, indicating that the drop volume changes caused a similar color shift for each group (each group having a different yellow dye). However, as can be seen from FIGS. 1 and 2, the print samples generated with the Y104 group, produced skin tones that are closer to the initial target values for preferred skin tones, such as the preferred caucasian values as reported in "The Reproduction of Color in Photography, Printing, and Television", 1987, p. 192 R. W. G. Hunt. Furthermore, most of the skin tones generated using Y 104 were within the desired hue angles, whereas, the skin tones generated with the DY132 group did not completely lie within the desired hue angles.

Example 2
EFFECT OF DYE SET ON LIGHTFADE

Two sets of inks were formulated having the following vehicle composition

| organic solvent | 7.5% 2-pyrrolidinone |
|---|---|
|  | 7.5% 1-Octyl-pyrrolidone |
| surfactant | 1.3% Dowfax 8390 |
|  | (anionic surfactant available from Dow Chemical) |
| biocide | 0.2% Proxel GXL |
| balance | water |

Each set comprised 3 inks of differing hues, namely, cyan, yellow, and magenta. The colorant used in the cyan ink was DB 199. The colorant used in the yellow inks of Sets 1 and 2 were DY132, and Yellow 104, respectively. The colorants used in the magenta inks of Set 1 and 2 were Reactive Red 29 (Red H-3BNA available from Zeneca Colors), and M377, respectively.

Lightfade was measured by printing a color palette on two sheets for each ink set, on one or more media, using the printing method described above.

The color palette comprised cyan, magenta, yellow, red, green, blue, and composite black squares of approximately 1 $cm^2$. In addition, a gray scale or gradient was generated by printing a series of 6 composite black squares, each square having different print densities (10 representing the highest print density). Furthermore, a series of skin tone colors were generated using the procedure described above. One of the print samples for each of the ink/media combination was placed in the dark and the other was exposed to the equivalent of one year of office light using an Atlas Fade-ometer. The color coordinates, $L^*, a^*$, and $b^*$ of the printed images on the two sheets were measured using the procedure described above. Light fade, represented by ΔE, for each sample was calculated using Equation 3, above.

It is desirable that the lightfade, ΔE, value be minimized. As evidenced by the date in Tables 3 and 4, the ink set comprising M377 and Y104 exhibited lower light fade compared to the other ink set.

TABLE 3

| Media | | ΔE For Color Blocks | | | | | | | |
|---|---|---|---|---|---|---|---|---|---|
| # | Ink Set | Cyan | Yellow | Magenta | Black | Red | Green | Blue | Average |
| gelatin | 1 | 4 | 12 | 11 | 5 | 7 | 3 | 6 | 7 |
| gelatin | 2 | 6 | 11 | 1 | 0.6 | 3 | 2 | 4 | 4 |
| clay | 1 | 16 | 23 | 25 | 19 | 28 | 12 | 20 | 20 |
| clay | 2 | 18 | 16 | 21 | 6 | 26 | 10 | 27 | 18 |
| plain | 1 | 10 | 17 | 15 | 10 | 14 | 11 | 13 | 13 |
| plain | 2 | 12 | 5 | 7 | 3 | 8 | 7 | 12 | 8 |

TABLE 4

| ΔE FOR GRAY COLORS | | | ΔE FOR SKIN TONES | | |
|---|---|---|---|---|---|
| COLOR BLOCK | INK SET 1 | INK SET 2 | COLOR BLOCK | INK SET 1 | INK SET 2 |
| Gray 1 | 1.2 | 0.8 | Skin 1 | 20.4 | 4.7 |
| Gray 2 | 8.5 | 1.8 | Skin 2 | 16.4 | 5.3 |
| Gray 3 | 14.8 | 3.9 | Skin 3 | 22.3 | 4.9 |
| Gray 4 | 16.8 | 5.4 | Skin 4 | 20.6 | 6.2 |
| Gray 5 | 15.4 | 5.5 | Skin 5 | 21.3 | 5.1 |
| Gray 6 | 7.4 | .6 | Skin 6 | 18.4 | 4.1 |
| Average Gray | 11 | 3 | Average Skin Tone | 15 | 4 |

Example 3
EFFECT OF DYE SET ON LIGHTFADE

An ink set was formulated having the following composition:

| organic solvent | 10% 1,2-hexanediol |
|---|---|
|  | 2% n-butanol |
| surfactant | 1% Tergitol 15-S-5 |
| biocide | 0.2% Proxel GXL |

-continued

| | |
|---|---|
| metal chelator | 0.2% EDTA |
| buffer | 0.2% MES |
| balance | water |

| dyes for each corresponding ink color | |
|---|---|
| yellow dye | Y104 |
| magenta dye | M377 |
| cyan dye | DB199 |

A color palette, and a series of gray scale and skin tone colors were generated using the method described in Example 2. Lightfade for this ink set on gelatin coated ink-jet media was measured according to the method described above. The results are reported in Tables 5.

TABLE 5

| Cyan | Magenta | Yellow | Black | Red | Green | Blue | | | Average |
|---|---|---|---|---|---|---|---|---|---|
| 6 | 3 | 6 | 6 | 3 | 2 | 6 | 5 | | |
| Gray 1 | Gray 2 | Gray 3 | Gray 4 | Gray 5 | Gray 5 | Gray 7 | Gray B | Gray 9 | Gray 18 |
| 4 | 6 | 7 | 7 | 8 | 9 | 8 | 4 | 2 | 6 | 6 |
| Skin 1 | Skin 2 | Skin 3 | Skin 4 | Skin 5 | Skin B | | | | |
| 8 | 10 | 9 | 10 | 8 | 6 | | | | 9 |

Thus, it has been demonstrated that inks formulated according to the present invention to contain a yellow colorant with a hue angle less than 90° and more specifically, a dye set comprising Y104, DB199, and M377 provide ink-jet images of near photographic quality, and, more specifically better skin tones colors and light fastness characteristics.

What is claimed is:

1. A set of ink-jet inks for ink-jet printing, including:
   at least one yellow ink containing at least one yellow colorant having a hue angle less than 90°;
   at least one cyan ink containing at least one cyan dye; and
   at least one magenta ink containing at least one magenta dye.

2. The set of ink-jet inks of claim 1 wherein the yellow colorant has a hue angle in a range from about 78° to less than 90°.

3. The set of ink-jet inks of claim 1 wherein the yellow colorant has a hue angle in a range from about 80° to about 88°.

4. The set of ink-jet inks of claim 1 wherein the yellow colorant is selected from the group consisting of Yellow 104, Direct Yellow 4, Direct Yellow 50, and mixtures thereof.

5. The set of ink-jet inks of claim 1 wherein the cyan dye comprises at least one phthalocyanine dye.

6. The set of ink-jet inks of claim 1 wherein the magenta dye is selected from the group consisting of Magenta 377, Reactive Red 29, Reactive Red 180, and mixtures thereof.

7. The set of ink-jet inks of claim 1 wherein the yellow colorant is Yellow 104 dye.

8. The set of ink-jet inks of claim 1 wherein
   the yellow colorant is Yellow 104 dye;
   the cyan dye is Direct Blue 199 dye; and
   the magenta dye is Magenta 377.

9. The set of ink-jet inks of claim 1 wherein each of said yellow, cyan, and magenta inks comprises from about 0.1 to about 5 wt % dye.

10. The set of ink-jet inks of claim 1 wherein each of said yellow, cyan, and magenta inks comprises from about 2.5 to about 5 wt % dye.

11. The set of ink-jet inks of claim 8 wherein each of said yellow, cyan, and magenta inks comprises from about 0.1 to about 5 wt % dye.

12. The set of ink-jet inks of claim 8 wherein each of said yellow, cyan, and magenta inks comprises from about 2.5 to about 5 wt % dye.

13. The set of ink-jet inks of claim 1 wherein each of said yellow, cyan, and magenta inks further comprises:
   about 5 to about 20 wt % of at least one diol;
   0 to about 5 wt % of at least one alcohol;
   0 to about 1.5 wt % of at least one component independently selected from the group consisting of surfactants, buffers, biocides, and metal chelators.

14. The set of ink-jet inks of claim 13
   wherein said at least one diol is selected from the group consisting of 1,2-butanediol, 1,4-butanediol, 1,2-pentanediol, 1,5-pentanediol, 1,2-hexanediol, 1,6-hexanediol, 2,5-hexanediol, 1,2-heptanediol, 1,2-octanediol, and 1,8-octanediol;
   wherein said at least one alcohol is independently selected from the group consisting of propanol, butanol, pentanol, hexanol, and isomers thereof; and
   wherein said at least one surfactant is a non-ionic surfactant selected from the group consisting of secondary alcohol ethoxylate surfactants predominantly having about 4 to about 8 ethoxylated units and an aliphatic chain from about 12 to about 18 carbon atoms, non-ionic fluoro surfactants, fatty acid ethoxylate surfactants, fatty amide ethoxylate surfactants, and mixtures thereof.

15. The set of ink-jet inks of claim 13
   wherein said at least one diol is selected from the group consisting of 1,2 pentanediol, 1,2-hexanediol, and 1,2-heptanediol;
   wherein said at least one alcohol is selected from the group consisting of n-butanol, iso-butanol, n-propanol, n-pentanol, and 1,2-butanediol; and
   wherein said at least one surfactant is selected from the group consisting of at least one secondary alcohol ethoxylate surfactant predominantly having about 5 to about 7 ethoxylated units and an aliphatic chain from about 14 to about 16 carbon atoms.

16. The set of ink-jet inks of claim 13
   wherein said at least one diol comprises 1,2-hexanediol;
   said at least one alcohol comprises n-butanol;
   said at least one surfactant comprises a secondary alcohol ethoxylate surfactant predominantly having about 5 ethoxylated units and an aliphatic chain of about 15 carbon atoms.

17. The set of ink-jet inks of claim 8 wherein each of said yellow, cyan, and magenta inks further comprises:
   about 8 to about 15 wt % of said at least one diol;

about 1 to about 5 wt % of said at least one alcohol;

about 0.5 to about 1.2 wt % of said at least one surfactant;

about 0.1 to 0.5 wt % of said at least one component independently selected from the group consisting of buffers, biocides, and metal chelators.

18. The set of ink-jet inks of claim 1 further including a black ink.

19. The set of ink-jet inks of claim 18 wherein the black ink comprises Processed Reactive Black 31.

20. The set of ink-jet inks of claim 18 wherein the black ink is formed on the printed media by the addition of the yellow ink, the cyan ink, and the magenta ink.

21. A method for ink-jet printing, said method comprising the steps of ejecting ink, said ink, including:

a yellow ink containing at least one yellow colorant having a hue angle less than 90°;

a cyan ink containing at least one cyan dye; and a magenta ink containing at least one magenta dye.

22. The ink-jet printing method of claim 21 wherein the yellow colorant has a hue angle in a range from about 78° to less than 90°.

23. The ink-jet printing method of claim 21 wherein the yellow colorant has a hue angle in a range from about 80° to about 88°.

24. The ink-jet printing method of claim 21 wherein the yellow colorant is selected from the group consisting of Yellow 104, Direct Yellow 4, Direct Yellow 50, and mixtures thereof.

25. The ink-jet printing method of claim 21 wherein the cyan dye comprises at least one phthalocyanine dye.

26. The ink-jet printing method of claim 21 wherein the magenta dye is selected from the group consisting of Magenta 377, Reactive Red 29, Reactive Red 180, and mixtures thereof.

27. The ink-jet printing method of claim 21 wherein the yellow colorant is Yellow 104 dye.

28. The ink-jet printing method of claim 21 wherein the yellow colorant is Yellow 104 dye;

the cyan dye is Direct Blue 199 dye; and the magenta dye is Magenta 377.

29. The ink-jet printing method of claim 21 wherein each of said yellow, cyan, and magenta inks comprises from about 0.1 to about 5 wt % dye.

30. The ink-jet printing method of claim 21 wherein each of said yellow, cyan, and magenta inks comprises from about 2.5 to about 5 wt % dye.

31. The ink-jet printing method of claim 28 wherein each of said yellow, cyan, and magenta inks comprises from about 0.1 to about 5 wt % dye.

32. The ink-jet printing method of claim 28 wherein each of said yellow, cyan, and magenta inks comprises from about 2.5 to about 5 wt % dye.

33. The ink-jet printing method of claim 21 wherein each of said yellow, cyan, and magenta inks further comprises:

about 5 to about 20 wt % of at least one diol;

0 to about 5 wt % of at least one alcohol;

0 to about 1.5 wt % of at least one component independently selected from the group consisting of surfactants, buffers, biocides, and metal chelators.

34. The ink-jet printing method of claim 33 wherein said at least one diol is selected from the group consisting of 1,2-butanediol, 1,4-butanediol, 1,2-pentanediol, 1,5-pentanediol, 1,2-hexanediol, 1,6-hexanediol, 2,5-hexanediol, 1,2-heptanediol, 1,2-octanediol, and 1,8-octanediol;

wherein said at least one alcohol is independently selected from the group consisting of propanol, butanol, pentanol, hexanol, and isomers thereof; and wherein said at least one surfactant is a non-ionic surfactant selected from the group consisting of secondary alcohol ethoxylate surfactants predominantly having about 4 to about 8 ethoxylated units and an aliphatic chain from about 12 to about 18 carbon atoms, non-ionic fluoro surfactants, fatty acid ethoxylate surfactants, fatty amide ethoxylate surfactants, and mixtures thereof.

35. The ink-jet printing method of claim 33 wherein said at least one diol is selected from the group consisting of 1,2 pentanediol, 1,2-hexanediol, and 1,2-heptanediol;

wherein said at least one alcohol is selected from the group consisting of n-butanol, iso-butanol, n-propanol, n-pentanol, and 1,2-butanediol; and wherein said at least one surfactant is selected from the group consisting of at least one secondary alcohol ethoxylate surfactant predominantly having about 5 to about 7 ethoxylated units and an aliphatic chain from about 14 to about 16 carbon atoms.

36. The ink-jet printing method of claim 33 wherein said at least one diol comprises 1,2-hexanediol;

said at least one alcohol comprises n-butanol;

said at least one surfactant comprises a secondary alcohol ethoxylate surfactant predominantly having about 5 ethoxylated units and an aliphatic chain of about 15 carbon atoms.

37. The ink-jet printing method of claim 28 wherein each of said yellow, cyan and magenta inks further comprises:

about 8 to about 15 wt % of said at least one diol;

about 1 to about 5 wt % of said at least one alcohol;

about 0.1 to 0.5 wt % of said at least one component independently selected from the group consisting of buffers, biocides, and metal chelators.

38. The ink-jet printing method of claim 21 further including a black ink.

39. The ink-jet printing method of claim 38 wherein the black ink comprises Processed Reactive Black 31.

40. The ink-jet printing method of claim 38 wherein the black ink is formed on the printed media by the addition of the yellow ink, the cyan ink, and the magenta ink.

* * * * *

UNITED STATES PATENT AND TRADEMARK OFFICE
CERTIFICATE OF CORRECTION

PATENT NO. : 5,858,075
DATED : January 12, 1999
INVENTOR(S) : Larrie A. Deardurff, et. al.

It is certified that error appears in the above-indentified patent and that said Letters Patent is hereby corrected as shown below:

Column 2, line 3 of the Patent, delete "as illustrated in FIGS. 1 and 2,"

Column 6, line 51 of the Patent, insert --biological-- after organic-based;

Column 6, line 51 of the Patent after buffers insert --or inorganic buffers, preferably, organic-based. Further, the buffers--;

Column 6, line 56 of the Patent delete "morpholinepropanesulfonic" and insert therefore --morpholineethanesulfonic--.

Column 7, line 6 of the Patent, delete "actions" and insert therefore --cations--.

Column 11, Table 5, of the patent in the column labeled GREEN, second row:
delete "Grey 5" and insert therefore --Grey 6--;

Column 11, Table 5 of the patent in the column after BLUE first row delete "5" and in the second row delete "Grey B" and insert therefore --Grey 8--;

Column 11, Table 5 of the patent in the column before AVERAGE delete "Grey 18" and insert therefore --Grey 10--;

UNITED STATES PATENT AND TRADEMARK OFFICE
CERTIFICATE OF CORRECTION

PATENT NO. : 5,858,075
DATED : January 12, 1999
INVENTOR(S) : Larrie A. Deardurff, et. al.

It is certified that error appears in the above-indentified patent and that said Letters Patent is hereby corrected as shown below:

Column 11, Table 5 of the patent in column AVERAGE, row one insert --5--.

Signed and Sealed this

Sixteenth Day of November, 1999

Attest:

Attesting Officer

Q. TODD DICKINSON

Acting Commissioner of Patents and Trademarks